United States Patent [19]

Buchta et al.

[11] Patent Number: 4,481,052
[45] Date of Patent: Nov. 6, 1984

[54] METHOD OF MAKING REFRACTORY HARD METAL CONTAINING TILES FOR ALUMINUM CELL CATHODES

[75] Inventors: William M. Buchta, Baltimore; Dennis C. Nagle, Catonsville, both of Md.

[73] Assignee: Martin Marietta Corporation, Bethesda, Md.

[21] Appl. No.: 461,893

[22] Filed: Jan. 28, 1983

[51] Int. Cl.$^3$ ............................................. B32B 31/26
[52] U.S. Cl. ................................... 156/155; 156/242; 204/290 R; 204/294; 427/113; 427/228; 427/380; 427/419.7
[58] Field of Search .............................. 156/155, 242; 204/290 R, 294, 67; 427/113, 228, 380, 419.1, 419.7

[56] References Cited

U.S. PATENT DOCUMENTS

| | | | |
|---|---|---|---|
| 3,400,061 | 9/1968 | Lewis et al. | 204/67 |
| 3,492,208 | 1/1970 | Seager | 204/67 |
| 3,616,045 | 10/1971 | Kozar et al. | 156/155 X |
| 3,661,736 | 5/1972 | Holliday | 204/67 |
| 4,093,524 | 6/1978 | Payne | 204/61 |
| 4,308,114 | 12/1981 | Das et al. | 204/67 |
| 4,333,813 | 6/1982 | Kaplan et al. | 204/291 X |
| 4,376,029 | 3/1983 | Joo et al. | 204/294 |

*Primary Examiner*—Robert Dawson
*Attorney, Agent, or Firm*—Gary Chin; Herbert W. Mylius

[57] ABSTRACT

This invention relates to electrolytic reduction cells for aluminum production wherein tiles have been placed upon the cathode surfaces to improve the cell operation. These tiles have aluminum-wettable surfaces, which reduce electrical losses and increase cathode life. The tiles are produced from a mixture of refractory hard metal (RHM), a thermosetting resin, carbonaceous fillers and carbonaceous additives. The tiles are physically formed, polymerized and/or cross linked, and carbonized to form a tile which can be inserted into a cell. The tile may have the RHM homogeneously dispersed throughout the tile structure, or it may have the RHM concentrated in layered form.

25 Claims, No Drawings

METHOD OF MAKING REFRACTORY HARD METAL CONTAINING TILES FOR ALUMINUM CELL CATHODES

BACKGROUND OF THE INVENTION

This invention relates to cathodes for electrolytic cells for the production of aluminum, and specifically to the preparation of cathode tiles. The cathode tiles are prepared of electroconductive materials, and have a surface that is aluminum wettable and contains refractory hard materials.

Aluminum is conventionally manufactured by an electrolytic reduction process conducted in Hall-Heroult cells, wherein alumina is dissolved in molten cryolite and electrolyzed at temperatures of 900–1000° C. These cells typically comprise a steel shell with an insulating lining of suitable refractory materials, which in turn is provided with a lining of carbon which contacts the molten bath, aluminum, and/or ledge. One or more anodes, usually made of carbon, are inserted into the molten cryolite and connected to a positive pole of a direct current source. The negative pole of the direct current source is connected to the carbon lining in the bottom of the cell. Molten aluminum resulting from the electrolytic reduction reaction is deposited on the carbon bottom of the cell in a molten pool or pad, which acts as a liquid metal cathode. Part of this pool of liquid is removed from time to time and collected as the product of the electrolysis process.

In the construction of most commercial cells, the carbon lining that forms the bottom of the cathode is conventionally built from an array of prebaked carbon blocks covering the portion of the cell to be lined, and then the carbon blocks are joined into a solid continuous assembly by ramming the slots between blocks with a mixture typically of calcined anthracite, modified coal tar pitch, and the like. This structure is then heated in the process of cell start-up. Life span of such constructed carbon linings in different plants averages three to eight years, but under adverse conditions may be considerably shorter. Deterioration occurs due to penetration of electrolyte components and liquid aluminum into the structure of the carbon blocks, ramming mix, and refractory materials, causing swelling and cracking. Aluminum metal penetration causes alloying away of steel current collector bars embedded in the cell bottom, which contaminates the aluminum pad and may lead to cell tap-out.

Other problems include accumulation of undissolved bath and alumina which are carried from the cryolite bath, ledge, and ore cover, to the cathode, creating sludge or muck. The presence of this sludge or muck under the aluminum pad creates areas on the cell bottom which disrupt electrical current distribution, resulting in excessive pad turbulence and disturbances through magnetic forces, hence reducing cell current efficiency.

A further drawback of the carbon cathode lining is its non-wettability by molten aluminum, which necessitates a deeper pad of aluminum, to ensure effective molten aluminum contact to the carbon lining or surface. These deep aluminum pads are subject to magnetic and electrical effects, such as standing waves, which increase the possibility of electrical shorting. To lessen this possibility, greater anode-to-cathode distances (ACD) are employed, resulting in additional voltage losses.

To reduce ACD and associated voltage drop, cathode materials using Refractory Hard Material (RHM), such as $TiB_2$, have been employed. $TiB_2$ is highly conductive and is wetted by liquid aluminum. This wettability property enables a thin film of molten aluminum to be deposited directly on the cathode structure made of RHM, and eliminates the need for a pad of metal, since contact with the underlying cathode structure is assured.

The use of titanium diboride current-conducting elements in electrolytic cells for the production of aluminum is described in the following exemplary U.S. Pat. Nos.: 2,915,442, 3,028,324, 3,215,615, 3,314,876, 3,330,756, 3,156,639, 3,274,093, and 3,400,061. Despite the rather extensive effort expended in the past, as indicated by these and other patents, and the potential advantages of the use of titanium diboride as a current-conducting element, such compositions do not appear to have been commercially adopted on any significant scale by the aluminum industry. Lack of acceptance of $TiB_2$ or RHM current-conducting elements of the prior art is related to their lack of stability in service in electrolytic reduction cells. It has been reported that such current-conducting elements fail after relatively short periods in service. Such failure has been associated with the penetration of the self-bonded RHM structure by the electrolyte, and/or aluminum, thereby causing critical weakening with consequent cracking and failure. It is well known that liquid phases penetrating the grain boundaries of solids can have undesirable effects. For example, RHM tiles wherein oxygen impurities tend to segregate along grain boundaries are susceptible to rapid attack by aluminum metal and/or cryolite bath. Prior art techniques to combat $TiB_2$ tile disintegration in aluminum cells have been to use highly refined $TiB_2$ powder to make the tile, containing less than 50 ppm oxygen at 3 or 4 times the cost of commercially pure $TiB_2$ powder containing about 3000 ppm oxygen. Moreover, fabrication further increases the cost of such tiles substantially. However, no cell utilizing $TiB_2$ tiles is known to have operated successfully for extended periods without loss of adhesion of the tiles to the cathode, or disintegration of the tiles. Other reasons proposed for failure of RHM tiles and coatings have been the solubility of the composition in molten aluminum or molten flux, or the lack of mechanical strength and resistance to thermal shock.

Additionally, different types of $TiB_2$ coating materials, applied to carbon substrates, have failed due to differential thermal expansion between the titanium diboride material and the carbon cathode block. To our knowledge no prior RHM-containing materials have been successfully operated as a commercially employed cathode substrate because of thermal expansion mismatch, bonding problems, etc.

For example, U.S. Pat. No. 3,400,061, of Lewis et al, assigned to Kaiser Aluminum, teaches a cell construction with a drained and wetted cathode, wherein the Refractory Hard Material cathode surface consists of a mixture of Refractory Hard Material, at least 5 percent carbon, and generally 10 to 20 percent by weight pitch binder, baked at 900° C. or more. According to the patent, such a composite cathode has a higher degree of dimensional stability than previously available. The composite cathode coating material of this reference may be rammed into place in the cell bottom. This technique has not been widely adopted, however, due to susceptibility to attack by the electrolytic bath, as taught by a later Kaiser Aluminum U.S. Pat. No. 4,093,524 of Payne.

Said U.S. Pat. No. 4,093,524, of Payne, claims an improved method of bonding titanium diboride, and other Refractory Hard Materials, to a conductive substrate such as graphite, or to silicon carbide. The cathode surface is made from titanium diboride tiles, 0.3 to 2.5 cm thick. However, the large differences in thermal expansion coefficients between such Refractory Hard Material tiles and carbon precludes the formation of a bond which will be effective both at room temperature and at operating temperatures of the cell. The bonding is accordingly formed in-situ at the interface between the Refractory Hard Material tile and the carbon by a reaction between aluminum and carbon to form aluminum carbide near the cell operating temperature. However, since the bond is not formed until high temperatures are reached, tiles are easily displaced during startup procedures. The bonding is accelerated by passing electrical current across the surface, resulting in a very thin aluminum carbide bond. However, aluminum and/or electrolyte attack upon the bond results if the tiles are installed too far apart, and if the plates are installed too close together, they bulge at operating temperature, resulting in rapid deterioration of the cell lining and in disturbance of cell operations. Accordingly, this concept has not been extensively utilized.

Holliday, in U.S. Pat. No. 3,661,736, claims a cheap and dimensionally stable composite cathode for a drained and wetted cell, comprising particles or chunks of arc-melted "RHM alloy" embedded in an electrically conductive matrix. The matrix consists of carbon or graphite and a powdered filler such as aluminum carbide, titanium carbide or titanium nitride. However, in operation of such a cell, electrolyte and/or aluminum attack grain boundaries in the chunks of arc-melted Refractory Hard Material alloy, as well as the large areas of carbon or graphite matrix, at the rate of about one centimeter per annum, leading to early destruction of the cathodic surface.

U.S. Pat. No. 4,308,114, of Das et al, discloses a contoured cathode surface comprised of Refractory Hard Material in a graphitic matrix. In this case, the Refractory Hard Material is composited with a pitch binder, and subjected to graphitization at 2350° C., or above. Such cathodes are subject to early failure due to rapid ablation, and possible intercalation and erosion of the graphite matrix.

In addition to the above patents, a number of other references relate to the use of titanium diboride in tile form. Titanium diboride tiles of high purity and density have been tested, but they generally exhibit poor thermal shock resistance and are difficult to bond to carbon substrates employed in conventional cells. Mechanisms of de-bonding are believed to involve high stresses generated by the thermal expansion mismatch between the titanium diboride and carbon, as well as aluminum penetration along the interface between the tiles and the adhesive holding the tiles in place, due to wetting of the bottom surface of the tile by aluminum. In addition to debonding, disintegration of even high purity tiles may occur due to aluminum penetration of grain boundaries. These problems, coupled with the high cost of the titanium diboride tiles, have discouraged extensive commercial use of titanium diboride in conventional electrolytic cells, and limited its use in new cell design. It is a purpose of the present invention to overcome the deficiencies of past attempts to utilize Refractory Hard Materials as a surface material for carbon cathode blocks.

This invention discloses a process for the manufacture of a Refractory Hard Material composition that can be prepared and formed into plates or tiles, can be extruded into plates or tiles, with a simple processing technique and heat treatment procedure.

Another object of this invention is to prepare tiles having a stratified or layer construction, allowing the RHM to be concentrated in a layer that will form the surface of the tile that will face the anode.

SUMMARY OF THE INVENTION

The present invention relates to an electrolytic cell for aluminum production wherein the cathode of the cell contains, as a portion of its exposed surface, elements, tiles, or plates which have a refractory hard metal composition, which is aluminum wettable. The method of manufacture of these elements is disclosed herein, whereby the refractory hard metal is uniformly dispersed within the matrix of the element, or the element may be of a layered configuration with a graphitic base and the RHM concentrated in a layer on the top surface.

The Refractory Hard Material is mixed with a thermosetting binder system, carbonaceous fillers, and carbonaceous additives, followed by polymerization and/or cross linking to form a hard mass, followed by carbonization to form a stable tile.

DETAILED DESCRIPTION OF THE INVENTION

According to the present invention, it has been found that tiles may be constructed using Refractory Hard Material (RHM) combined with specified thermosetting bonding agents and other materials to form plate or tile structures that improve the operation of conventional aluminum reduction cells. Such improvements include wettability by molten aluminum, low solubility in the molten aluminum and cryolite environment, good electrical conductivity, and decreased muck adhesion.

In understanding the concept of the present invention, it is important that certain distinctions and definitions be observed. Accordingly, the following definitions shall be applied with respect to this invention.

The "molding composition" of the present invention is comprised of Refractory Hard Material, carbonaceous additive, carbonaceous filler, and binder system. As used herein, the terms "molding composition" or "molding material" shall be intended to encompass the combination of all of these materials.

The "Refractory Hard Materials" are in general defined as the borides, carbides, silicides, and nitrides of the transition metals in the fourth to sixth group of the periodic system, often referred to as Refractory Hard Metals, and alloys thereof.

"Resinous binder" shall be used to designate a polymerizable and/or cross-linkable thermosetting carbonaceous substance.

The "mix liquid" of the present invention functions in a variety of manners in the molding composition of the present invention, depending upon specific composition. It may be present to allow easy and uniform mixing of the solid components of the composition and to provide an easily spreadable mass. Certain mix liquids, such as furfural, may also permit an increase in the amount of carbonaceous filler which may be incorporated in the composition. The mix liquid also permits wicking of the resin into interstitial voids between particles of the molding composition by capillary action. The mix liquid may act solely as a solvent for the resinous binder (already present in the solids portion of the binder system), such as methyl ethyl ketone (which could dissolve a novolac if present in the solids), and be evaporated during cure and carbonization operations. If, on the other hand, the mix liquid is present simply as an inert carrier liquid, then it too may be evaporated during cure and carbonization. Otherwise, the mix liquid may function as a combined solvent and resin former, such as furfuryl alcohol and furfural, part of which volatilizes during heating while the remainder become incorporated into the resinous binder. In another instance, the mix liquid may be the resinous binder per se, such as where the resinous binder is a liquid such as furfural (generally in combination with phenol), furfuryl alcohol, or low polymers of these, or a resole. The mix liquid may also comprises the resinous binder in the case of a solid resin, such as a novolac, dissolved in a solvent (the solvent portion of which may volatilize during heat up), or a high viscosity resin such as a partially polymerized resole thinned by a solvent. The mix liquid may also contain gas release agents, modifying agents, and curing agents.

"Binder system" shall be used to indicate resinous binder, mix liquid, and, if required, gas release agents, modifying agents, and curing agents.

"Gas release agent" shall be taken to mean agents present which form liquid phases which seep through the molding composition and then evaporate, to create small channels to permit release of volatiles.

"Modifying agents" shall be taken to mean materials added to the resinous binder to modify, for example, curing, electrical properties, or physical properties such as flexural strength or impact strength prior to carbonization.

"Curing agents" shall be taken to mean agents required to either copolymerize with the resin or to activate the resin to a state in which the resin may polymerize or copolymerize. Cross-linking or activating agents fall into this category, as do catalysts required for most polymerization and cross-linking reactions.

"Carbonaceous filler" shall be interpreted to mean those carbonaceous materials present, either as a component of a known carbon cement or as part of a proprietary or custom carbon system, having a C:H ratio greater than 2:1, which are −100 mesh in size. While a carbonaceous filler may have reactive groups present, and need not be fully carbonized, such materials do not polymerize with themselves as the resinous binder material does. Further, carbonaceous filler is essentially insoluble in commonly used solvents such as methyl ethyl ketone or quinoline, while the resinous binder (in its incompletely cured state) is usually soluble therein.

"Carbonaceous additives" shall be those carbonaceous materials present, either as a component of a known carbon cement or as part of a proprietary or custom carbon system, having a C:H ratio greater than 2:1, which comprise particulate carbon aggregate having a particle size range between −4 mesh and +100 mesh, and/or carbon fibers.

The term "carbon system" shall encompass binder system plus carbonaceous additive and carbonaceous filler.

"Carbon cement" shall be taken to mean a commercially available carbonaceous cement or adhesive, generally comprising a resinous binder, mix liquid, carbonaceous filler, and curing agents, the solid and liquid portions of which may be packaged separately to increase shelf life, or as a premixed cement. Gas release agents, and/or modifying agents may be present in such systems, or may be added thereto for use in the present invention. Carbonaceous additives are generally added to such systems for use in the present invention if not present in the commercially available formulation.

Pitch may be present as part of the resinous binder, as a modifying material, but requires the presence of a suitable curing agent, such as hexamethylenetetramine. Such a curing agent may be already present as a component of the resinous binder, or may be added thereto to facilitate cross-linkage between the resinous binder and the pitch, or linkage between the pitch and carbonaceous filler, or self-linkage between the polynuclear aromatics which comprise the bulk of pitch. Although pitch is known to constitute a graphite precursor, graphitization is not realized in the present invention. Thus, the graphite precursor is dispersed within the resinous binder, which is an amorphous carbon precursor. Pitch may seep through the molding composition to provide gas release channels, and may, in the presence of appropriate curing agents, cross link with the resinous binder and/or the carbonaceous filler.

It is desirable that the amount of shrinkage that the cured binder system undergoes during carbonization be as small as possible. This may be accomplished by selection of a carbonaceous resin which when utilized in accordance with the present invention will provide a composition which when subjected to carbonization exhibits a shrinkage less than that which would induce formation of large cracks or voids. Fine vertical cracking within the carbonized tile is an acceptable stress relief mechanism. The presence of carbonaceous additive and/or filler is beneficial.

It has been found critical to utilize a binder system which, when subjected to carbonization, has a char yield of greater than about 25 percent. Char yield is defined herein as the mass of stable carbonaceous residue formed by the thermal decomposition of unit mass of the binder system. Thermogravimetric analyses of various binder systems have demonstrated that the amount of char yield is a function of the aromaticity of the resin structure. In general, carbon rings that are bonded at two or more sites will usually remain as char. Ladder polymers are the most stable, losing only hydrogen, and giving a very high carbon char yield.

Char yield of a binder system, as utilized herein, is determined by curing a proposed carbon system (i.e. binder system plus carbonaceous filler) for a 24 hour period so as to achieve polymerization and/or cross-linkage, followed by heating at 250° C. for sufficient time to achieve constant weight, so as to eliminate volatiles, polymerization products, and/or unreacted liquid. The sample is then sintered to 1000° C. in a non-oxidizing atmosphere, and the remaining char weight determined. Similarly, the char weight of carbonaceous filler present in the carbon system is determined, and subtracted from the char weight of the carbon system to determine the char weight of the binder system. From the weight of the carbon system at 250° C., and the known weight of carbonaceous filler at 250° C., one may calculate the weight of the binder system at 250° C. The char yield of the binder system is then calculated, as a percentage, from the char weight of the binder system and the weight of the binder system at 250° C. It has been observed that binder systems exhibiting a char yield of greater than about 25 percent give acceptable coatings upon cure and carbonization, while a binder system exhibiting 8 percent char yield gave an unacceptable carbon matrix upon carbonization. Char yields in excess of 50 percent are preferred.

To achieve a long-lasting tile in the environment of an aluminum cell, it is desired that the rate of ablation of the cured and carbonized carbon system be close to that of the Refractory Hard Material in such environment. As the Refractory Hard Material is removed from the tile, the carbon matrix thereof is removed at a similar or very slightly faster rate, thus exposing additional Refractory Hard Material to the cell environment. In this manner, the cathode surface remains essentially constant, in terms of Refractory Hard Material content, thus improving cell operation as measured by uniformity of performance. In previous attempts to provide Refractory Hard Material cathodes, ablation and/or intergranular attack have resulted in rapid surface deterioration due to depletion of either the Refractory Hard Material or the carbon matrix at a rate greater than the other, resulting in periods when there are localized areas having either a Refractory Hard Material-rich surface composition with insufficient binding capability, or a carbon-rich surface with insufficient Refractory Hard Material. The present invention overcomes these failures by providing a tile in which Refractory Hard Material and carbon matrix are dissolved or otherwise depleted at approximately equal rates.

It is important to clarify or distinguish between carbonizing and graphitizing as they apply to heating carbonaceous bodies in the context of the present invention. "Carbonizing" is normally done by heating a carbonaceous body, either in unitary or particulate form, for the purpose of driving off volatiles, and progressively increasing the ratio of carbon to hydrogen, and to progressively eliminate hydrogen from the body. In the carbonizing process, temperature is gradually increased to allow for the slow evolution of volatiles such as decomposition products so as to avoid blister formation, and to permit volumetric shrinkage (which will occur at some point in the operation) to proceed gradually, so as to avoid formation of large cracks. While curing is considered to take place at temperatures up to about 250° C., carbonization temperatures normally range from about 250° C. to about 1000° C., although higher temperatures up to 1600° C. or higher also can be employed. While carbonization may be continued to about 1000° C., or higher, the carbonization of the carbonaceous materials present is essentially complete at about 800° C., and the resinous binder has been carbonized to bind the filler materials and RHM into a durable structure.

One acceptable practice in producing carbonaceous tiles according to the present invention is to employ particulate graphite as a filler material which is added to the binder and other components. The mixture is then formed, cured, and carbonized. While this carbonized carbonaceous material may contain some graphite, it is not bonded by the graphite, but rather contains both graphite particles from the filler and amorphous carbon derived from the binder and/or components of the carbonaceous filler. In practicing the present invention it is important that the carbonized cathode tile be constituted of a non-graphitizing binder so as to assure the proper combination of electrical and thermal conductivity, ablation rate, and stability properties in the carbon-Refractory Hard Metal surface. However, if forming a multi-layer construction tile, it is preferred that the bottom layer, or base layer, be as similar as feasible to the upper, or RHM-containing, layer so as to minimize thermal expansion mismatch.

While the borides, carbides, silicides and nitrides of elements in Groups IV to VI of the Periodic Table generally all possess high melting points and hardness, good electrical and thermal conductivity, are wetted by molten aluminum, and are resistant to aluminum and alumina-cryolite melts, $TiB_2$ is the preferred RHM due to its relatively low cost and high resistance to oxy-fluoride melts and molten aluminum. Suitably, Refractory Hard Material particle sizes may range from submicron to about 10 mesh, and preferably from submicron to about $-100$ mesh, and most preferably about $-325$ mesh.

The $TiB_2$ preferred for use in this invention is typically specified as $-325$ mesh. If the $TiB_2$ is made by carbothermic reduction of titanium and boron oxides and carbides, individual particles will normally fit the prerequisite category of single crystals. This also holds true for $TiB_2$ made by plasma methods described in U.S. Pat. No. 4,282,195 to Hoekje of PPG Industries.

Other RHM materials may be successfully substituted for $TiB_2$ when appropriate changes in the composition are made to account for differences in wettability, surface area, particle size, porosity, and solubility of the RHM. Sufficient RHM is incorporated in the molding composition to ensure aluminum wetting, while thermal expansion mismatch effects are minimized and a dissolution rate of Refractory Hard Material less than the rate of loss of the carbon matrix of the coating is achieved. While discussion of the invention will focus on the use of $TiB_2$ as the preferred RHM, it is contemplated that any suitable RHM, such as $ZrB_2$ or alloys of Refractory Hard Materials, may be utilized. Sufficient RHM is provided in the molding composition to ensure wettability. In general, the RHM may comprise from about 10 to about 90 percent by weight of the composition, and preferably from about 20 to about 70 percent. It has been found that wettability may be achieved at concentrations below about 10 percent, but better results are achieved at ranges from 20 percent upward, with from about 35 to about 60 percent being the most preferred range.

The resinous binders of the present invention may comprise any which meet the aforementioned criteria. Typical resins which can be employed include phenolic, furane, polyphenylene, heterocyclic resins, epoxy, silicone, alkyd, and polyimide resins. Examples of phenolic resins which can be employed include phenol formaldehyde, phenol acetaldehyde, phenol-furfural, m-cresol-formaldehyde and resorcinolformaldehyde resins. Epoxy resins which can be utilized include the diglycidyl ether of bisphenol A, diglycidyl ether of tetrachlorobisphenol A, diglycidyl ether of resorcinol, and the like, and especially the epoxy novolacs. Preferred epoxies comprise the glycidyl ethers such as the glycidyl ethers of the phenols, and particularly those prepared by reacting a dihydric phenol with epichlorhydrin, e.g., the diglycidyl ether of bisphenol A, and epoxy novolacs. The silicone polymers which can be employed include methyl siloxane polymers and mixed methyl phenyl siloxane polymers, e.g., polymers of dimethyl siloxane, polymers of phenylmethylsiloxane, copolymers of phenylmethylsiloxane and dimethylsiloxane, and copolymers of diphenylsiloxane and dimethylsiloxane. Examples of heterocyclic resins are polybenzimidazoles, polyquinoxalines and pyrrones. Any of the well known specific alkyds, particularly those modified with phenol formaldehyde, and polyimide resins can be employed. The phenolics and furanes are the preferred class of resins, particularly in view of relatively low costs. Furane resins are very advantageously employed as the resinous binder of this invention.

In addition to those set forth as components of the commercially available carbon cements, such as UCAR ® C-34, discussed hereinafter, a wide variety of novolac resins may be used as the basic resinous binder in the present invention. The term novolac refers to a condensation product of a phenolic compound with an aldehyde, the condensation being carried out in the presence of an acid catalyst and generally with a molar excess of phenolic compound to form a novolac resin wherein there are virtually no methylol groups such as are present in resoles, and wherein the molecules of the phenolic compounds are linked together by a methylene group. The phenolic compound may be phenol, or phenol wherein one or more hydrogens are replaced by any of various substituents attached to the benzene ring, a few examples of which are the cresoles, phenyl phenols, 3,5-dialkylphenols, chlorophenols, resorcinol, hydroquinone, xylenols, and the like. The phenolic compound may instead be naphthyl or hydroxyphenanthrene or another hydroxyl derivative of a compound having a condensed ring system. It should be noted that the novolac resins are not heat curable per se. Novolac resins are cured in the presence of curing agents such as formaldehyde with a base catalyst, hexamethylenetetramine, paraformaldehyde with a base catalyst, ethylenediamine-formaldehyde, and the like.

For purposes of the present invention, any fusible novolac which is capable of further polymerization with a suitable aldehyde may be employed. Stated another way, the novolac molecules should have two or more available sites for further polymerization and/or cross-linkage. Apart from this limitation, any novolac might be employed, including modified novolacs, i.e., those in which a nonphenolic compound is also included in the molecule, such as the diphenyl oxide or bisphenol-A modified phenol formaldehyde novolac. Mixtures of novolacs may be employed or novolacs containing more than one species of phenolic compounds may be employed.

Furfuryl alcohol may be employed as the mix liquid in the phenolic carbonaceous binder, and is believed to react with the phenolic resin as it cures, and serves as a modifying agent for the resin. The use of furfuryl alcohol is preferred as it has been found that bonds having the high strength obtainable through the use of this mix liquid cannot be produced when other mix liquids are substituted for furfuryl alcohol. Thus, for example, when furfuraldehyde is employed in place of furfuryl alcohol in otherwise identical compositions, bonds are produced having only about half the strength of the bonds produced using the furfuryl alcohol.

Since the net final effect desired is to achieve a surface layer composed essentially of RHM and carbon, the binder system should be readily decomposable, in high yield, to a carbon residue. Such components as resinous binder should comprise from about 1 to about 40 percent of the composition, whether as a part of a carbon cement or as a custom carbon system. The resin per se may constitute up to about 50 percent or more by weight of the composition. Although higher resin concentrations are possible, little advantage is attained, and extended cure and carbonization cycles may be required. The carbon system should comprise about 10 to about 90 percent of the coating composition, preferably from about 30 to about 80 percent, and most preferably from about 40 percent to about 65 percent of the composition applied to the substrate.

One may utilize appropriate blends of carbon and phenolic resin or other thermosetting resinous binders of the appropriate particle sizes, or alternative commercial compositions. The mix liquid component of the coating composition may vary from approximately 2 weight percent to about 40 weight percent for reasonable evaporation and curing rates, with about 5 percent to about 25 percent being preferred to obtain workable consistency. It is desired that the coating composition be workable and easily spread, as by a trowel. Insufficient liquid will make the mix dry and unspreadable, while excessive liquid results in difficulties in curing and baking.

Various modifying agents may be present to modify the nature of the resinous binder during mixing, curing, and carbonization of the molding composition. These may typically constitute from zero to about 10 percent by weight of the coating composition. Suitable modifying agents for phenol formaldehyde resins, for example, include rosin, aniline, copolymers, resin "alloys", etc.

Frequently, pitch is present in the coating composition, as a modifying agent or a binder, in concentrations of up to about 50 or even 75 percent when present as a functional ingredient of the binder system. When present as a modifying agent per se, pitch may be present in concentrations up to about 10 percent by weight of the coating composition.

In addition to the RHM and binder system, which may itself include a filler material, it is desirable to provide additional particulate carbon. Some particulate carbon, either amorphous or graphitic, is frequently present in the commercially available cements mentioned heretofore. Further particulate carbon may be added, as either fine powder or coarse aggregate, or mixtures thereof, in the form of amorphous carbon or graphitic carbon.

It is highly desirable to have a carbonaceous filler material present, either as a component of a proprietary carbon system or present in a commercial cement, or as an addition to a commercial cement. Such carbonaceous filler is $-100$ mesh, and preferably $-325$ mesh, and may comprise fine carbonaceous flour, graphite flour, crushed coke, crushed graphite, carbon black, and the like. The presence of such fine flours yields improved packing density for the granulometry used, that wicks up resin forming liquids to form a dense, highly bonded carbon matrix upon carbonization.

Carbonaceous filler, as fine flour, should comprise from about 1 percent to about 60 percent of the composition, with about 10 percent to about 40 percent being preferred.

The carbonaceous additive, or aggregate material, if present, may run from $-4$ mesh to $+100$ mesh, and is preferably between $-8$ mesh and $+20$ mesh. Such coarse aggregate apparently permits micro-cracking, assists volatile emission release, reduces shrinkage, and contributes to high carbon yield. Carbonaceous additive, as aggregate and/or fiber, should comprise from about 0 percent to about 70 percent of the molding composition, with from about 5 percent to about 15 percent being preferred.

As previously set forth, it is preferred that carbon fiber be added to the molding composition as a crack arrestor. When such fiber is used, some variations in composition ranges have been found. When carbon fibers are used, they may preferably be made from pitch precursors, organic fiber precursors such as polyacrylonitrile, or rayon. Pitch fibers are considerably cheaper, and accordingly preferred. Fiber weight may range from zero percent to about 10 percent by weight of the composition, preferably from about 0.05 to about 1.0 percent, and more preferably from 0.05 to about 0.5 percent. However, concentrations greater than about 10 percent become comparatively expensive, with little apparent added benefit. Carbon fibers with lengths varying from about 0.16 cm to 1.27 cm length are preferred. Short fibers permit easier mixing, and may be used in higher concentration. Sized fibers, consisting of parallel fiber strands bonded together by a material soluble in the mix liquid, are particularly preferred, since they blend most easily with the binder system. Fiber orientation may vary, and the fibers can be mixed as an integral part of the composition.

Gas release agents are appropriately included in the coating composition to avoid blisters and/or excessively large cracks. Suitable gas release agents include combustible oils, soaps, and waxes.

A preferred binder system is that which is commercially designated as UCAR® C-34, marketed by Union Carbide. This composition is believed to comprise a mixture of an oil, a soap, finely-divided carbonaceous particles, furfuryl alcohol, a phenolic resin of the novolac type, and a hardening agent for the phenolic resin. The mixture of the oil, finely-divided carbonaceous particles, phenolic resin, and phenolic resin hardener can be prepared by blending the carbonaceous particles, phenolic resin and phenolic resin hardener together in any conventional manner, e.g. in a tumbling barrel, spraying the oil into the resulting mixture, and further blending the mixture until the oil has been incorporated therein and a substantially homogeneous blend formed. The mixture of soap and furfuryl alcohol can be prepared by heating the soap up to a temperature of about 100° C. to liquify it, and then dissolving the molten soap in the furfuryl alcohol. Upon cooling, the soap remains dissolved in the furfuryl alcohol as a stable solution which can be stored until it is ready to be mixed with the mixture of oil, finely divided carbonaceous particles, phenolic resin, the phenolic resin hardener. The two mixtures, one liquid and the other essentially solid, can be readily mixed at room temperature, either manually or mechanically.

The RHM composition can be cast into molds and allowed to polymerize and/or cross link into a rigid structure, to be followed by heating to remove volatiles, entrapped gases and combustion products.

The RHM composition can also be extruded into a shaped form, e.g. ribbon, wherein the resin polymerizes during the extrusion operation and the pressures of extrusion remove the gases to produce a formed tile structure. Extrusion techniques can also be used to extrude the RHM composition into molds for final polymerization to obtain shaped structures, e.g. contoured tiles.

The tiles may also be formed in layers, that is a mixture may be cast, and may or may not be polymerized, followed by additional layers being placed on the surface of the previous layer. This manufacturing method will produce multi-layer tiles, wherein the compositions of adjacent layers may be varied.

The tiles of the present invention may be adhered to a carbon block substrate by use of a carbonaceous cement, such as are commercially available. Alternatively, the tile may be adhered by using, as a cement, the molding composition absent the RHM, suitably modified to compensate for workability.

The following examples will provide representative procedures for the production of tiles. Examples 1 and 2 will demonstrate the production of composite or homogeneous tiles, while Examples 3 and 4 will show multi-layer tile preparation.

EXAMPLE 1

The following composition was placed in a ball mill and mixed for about 5 hours:

| | |
|---|---|
| $TiB_2$ (−325 mesh) | 20% (by weight) |
| Varcum resin 22-655* | 11% |
| Graphite (−325 mesh) | 69% |

*A commercial phenol-formaldehyde resin supplied by Reichold Chemical Corporation.

Tiles were fabricated by hot pressing in a steel mold, 15.2 cm × 15.2 cm, with a 7.6 cm depth. Prior to pressing the mold was heated to about 160° and held at this temperature during the pressing operation. About 700 grams of the molding composition was placed in the mold and leveled. A pressure of about 4500 psi was applied and released. This is known as "bumping the mold" and is repeated several times to allow the release of gases evolved during resin cure. Finally, the mold was subjected to a constant pressure of about 4500 psi and held for about six minutes. At the end of this period the tile, approximately 1.5 cm thick, was ejected.

Following the curing operation, the tiles were heat treated to about 1000° C. to carbonize the resin components. The temperature was raised from room temperature to 1000° C. over a 24 hour period and then allowed to cool. The carbonization or sintering operation was performed in a neutral or reducing atmosphere. Tiles formed in this manner were hard and dense, and have a metallic "ring" when struck.

EXAMPLE 2

The procedure of Example 1 was followed with a formulation consisting of:

| | |
|---|---|
| $TiB_2$ (−325 mesh) | 40% (by weight) |
| Varcum phenolic resin 24-655 | 8% |
| Graphite (−325 mesh) | 52% |

In view of the increased density resulting from the presence of 40% $TiB_2$, only 8% phenolic resin was required. Additional resin results in blistering problems during cure, due to entrapped gases.

When employing the lower resin content, it was found that the press time could be reduced from 6 minutes to 3 minutes, with no adverse effects. Increasing the hot-pressing temperature from 160° C. to 190° C. further reduced press time to 2 minutes per tile. Following carbonization, the tiles were hard and dense, and yield a metallic ring.

EXAMPLE 3

A bi-layer tile was prepared by mixing a base material composed of 90% (by weight) graphite (−325 mesh) and 10% Varcum phenolic resin 24-655. This mixture was ball milled for about 5 hours to thoroughly blend the materials. About 400 grams were placed into the 15.2 cm × 15.2 cm mold described in Examples 1 and 2, and leveled. About 200 grams of the mixture described in Example 2 (40% TiB$_2$) were placed on top of the base material and leveled. The pressure and heating parameters used in Example 2 were followed. The resulting tile contained no defects and a thin, 0.3 cm layer containing the RHM (TiB$_2$) could be clearly discerned, strongly adherent to the base layer.

EXAMPLE 4

A bi-layer tile was prepared according to the procedure described in Example 3, except that the RHM composition contained 20% TiB$_2$ as prepared in Example 1. The pressure and heating cycles followed were those described in Example 1. The resulting tile contained no defects and a thin RHM layer was easily discerned.

The cured tiles, upon removal from the mold, do not require heat treatment or carbonization before installation in an aluminum cell. The green tiles can be cemented to the cathode cell bottom and heat treated as the cell is heated to operting temperatures. Alternatively, the tiles may be cemented to the "green" cathode blocks and carbonized as the blocks go through normal heat treatment.

The heat and pressure cycles must be varied as resin content and type of resin selected are varied. Tiles with a higher resin concentration should receive a longer heat treatment period due to the increased amount of gases evolved. Heating rates from 25° up to 1000° C. can vary, up to about 300 hours. The heating treatments may be done outside the cell or in situ.

Tiles made in accordance with Examples 1 and 2 were exposed to the environment of an operating pilot plant scale aluminum reduction cell for a three month period. These tiles were cemented to the bottom surface of the cell, along with samples of pure TiB$_2$ tile made by conventional techniques. After 3 months exposure, the tiles made in accordance with the present invention were still intact and had suffered no visible attack or deterioration, while the pure TiB$_2$ tiles had either been destroyed or dislodged from the cell bottom.

An alternative to hot-pressing tiles and cementing them to a carbon cathode block is to hot-press directly onto the substrate. This could be done by placing the substrate in a die or form, and filling with a molding composition such as described, and hot-pressing to the pressure and temperatures necessary to achieve curing. The substrate could be a conventional cathode block, or another carbon monolithic surface which could later be installed in a cell. The resulting structures could then be heat-treated and carbonized either in situ or external to the cell. The composition may be hot-pressed to "finished" carbon block (as received from the cathode block manufacturer), or on green, as extruded cathode block and then carbonized with the block as it is heat-treated. Such a technique enables one to avoid previous problems of bonding or adhering RHM tiles to a cathode block substrate.

While the discussion as related to this invention has been directed to tile and plate configurations, normally considered to be rectangular or square, the present invention also encompasses other configurations, such as cylindrical, or tubular. Further, it is recognized that elements made in accordance with the present invention may be placed on a cathode substrate in such a fashion as to form a contoured cathode array.

It is understood that the above description of the present invention is susceptible to adaptations, modifications, and changes by those skilled in the art, and the same are intended to be considered within the scope of the present invention, which is set forth in the appended claims.

We claim:

1. A method for preparing an aluminum-wettable cathode surface, which method comprises:
   (a) preparing a molding composition of Refractory Hard Material, carbonaceous filler having a particle size less than 100 mesh, and a thermosetting resinous binder system having a char yield greater than 25 percent;
   (b) hot-pressing said composition to the surface of a cathode block to form a cured, adherent surface layer thereupon; and
   (c) carbonizing said surface layer to a carbonaceous matrix containing Refractory Hard Material, bonded by amorphous carbon.

2. The method of claim 1, wherein said Refractory Hard Material comprises from about 20 to about 70 percent by weight of the molding composition, and is selected from the group consisting of titanium diboride, titanium carbide, zirconium diboride, zirconium carbide, and alloys thereof.

3. The method of claim 2, wherein said Refractory Hard Material is titanium diboride.

4. The method of claim 3, wherein said titanium diboride comprises from about 30 to about 60 percent by weight of said molding composition.

5. The method of claim 1, wherein the thermosetting resinous binder system comprises resin selected from the group consisting of phenolic, polyphenylene, heterocyclic, silicone, and alkyd resins.

6. The method of claim 5, wherein said resinous binder system has a char yield greater than about 50 percent.

7. The method of claim 1, wherein said molding composition further comprises a carbonaceous additive having a particle size of from about −4 mesh to about +100 mesh.

8. The method of claim 7, wherein the molding composition comprises from about 20 to about 70 percent by weight titanium deboride, from about 1 to about 60 percent by weight carbonaceous filler and additive, and from about 20 to about 60 percent by weight resinous binder system.

9. A method for forming an aluminum-wettable cathode surface, which method comprises:
   (a) preparing a molding composition of Refractory Hard Material, carbonaceous filler having a particle size less than 100 mesh, and a thermosetting resinous binder system having a char yield greater than 25 percent;
   (b) hot pressing said composition to form a cured, rigid element comprising Refractory Hard Material in a carbonaceous matrix;
   (c) further heating said element to fully carbonize said matrix without graphitizing the carbon present in the binder system; and (d) adhering the thus carbonized element to a carbon cathode block.

10. The method of claim 9, wherein said Refractory Hard Material comprises from about 20 to about 70 percent by weight of the molding composition, and is selected from the group consisting of titanium deboride, titanium carbide, zirconium diboride, zirconium carbide, alloys thereof.

11. The method of claim 10, wherein said Refractory Hard Material is titanium diboride.

12. The method of claim 11, wherein said titanium diboride comprises from about 30 to about 60 percent by weight of said molding composition.

13. The method of claim 12, wherein the thermosetting resinous binder system comprises resin selected from the group consisting of phenolic, polyphenylene, heterocyclic, silicone, and alkyd resins.

14. The method of claim 13, wherein said resinous binder system has a char yield greater than about 50 percent.

15. The method of claim 14, wherein said molding composition further comprises a carbonaceous additive having a particle size of from about −4 mesh to about +100 mesh.

16. The method of claim 15, wherein the molding composition comprises from about 20 to about 70 percent by weight titanium diboride, from about 1 to about 60 percent by weight carbonaceous filler and additive, and from about 20 to about 60 percent by weight resinous binder system.

17. A method for forming an aluminum-wettable cathode surface, which method comprises:
(a) preparing a molding composition of Refractory Hard Material, carbonaceous filler having a particle size less than 100 mesh, and a thermosetting resinous binder system having a char yield greater than 25 percent;
(b) hot pressing said composition to form a cured, rigid element comprising Refractory Hard Material in a carbonaceous matrix;
(c) adhering said rigid element to a carbon cathode block; and
(d) carbonizing said element in situ to form a carbon block having a surface layer comprising Refractory Hard Material in a carbonaceous matrix bonded by amorphous carbon.

18. A method for preparing an aluminum-wettable cathode surface, which method comprises:
(a) preparing a molding composition of Refractory Hard Material, carbonaceous filler, and a thermosetting resinous binder system having a char yield greater than 25 percent;
(b) preparing a carbon mixture of carbonaceous filler and thermosetting resinous binder system;
(c) hot-pressing and carbonizing a layered structure of said molding composition and said carbon mixture to form a unitary layered element of Refractory Hard Material in a carbonaceous matrix, and carbon; and
(d) adhering said element to a carbon cathode block with said Refractory Hard Material containing carbonaceous matrix exposed.

19. The method of claim 18, wherein said Refractory Hard Material comprises from about 20 to about 70 percent by weight of the molding composition, and is selected from the group consisting of titanium diboride, titanium carbide, zirconium diboride, zirconium carbide, and alloys thereof.

20. The method of claim 19, wherein said Refractory Hard Material is titanium diboride.

21. The method of claim 20, wherein said resinous binder system is selected from the group consisting of phenolic, polyphenylene, heterocyclic, silicone, and alkyd resins.

22. The method of claim 21, wherein at least one of the molding composition and the carbon mixture further comprises a carbonaceous additive having a particle size of from about −4 mesh to about +100 mesh.

23. The method of claim 20, wherein the molding composition comprises from about 20 to about 70 percent by weight titanium diboride, from about 1 to about 60 percent by weight carbonaceous filler and additive, and from about 20 to about 60 percent be weight resinous binder system.

24. The method of claim 20, wherein said layered structure is hot-pressed in-situ on the carbon cathode block.

25. The method of claim 24, wherein said layered structure is carbonized to form an element having a layer of Refractory Hard Material in a carbonaceous matrix bonded by amorphous carbon, and a layer of carbon directly in contact and bonded to the carbon cathode block.

* * * * *